US009261960B2

(12) United States Patent
Lacroix et al.

(10) Patent No.: US 9,261,960 B2
(45) Date of Patent: Feb. 16, 2016

(54) HAPTIC SENSATION RECORDING AND PLAYBACK

(71) Applicant: IMMERSION CORPORATION, San Jose, CA (US)

(72) Inventors: Robert Lacroix, San Jose, CA (US); Juan Manuel Cruz-Hernandez, Montreal (CA); Jamal Saboune, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 37 days.

(21) Appl. No.: 13/804,692

(22) Filed: Mar. 14, 2013

(65) Prior Publication Data
US 2014/0205260 A1    Jul. 24, 2014

Related U.S. Application Data

(60) Provisional application No. 61/756,418, filed on Jan. 24, 2013.

(51) Int. Cl.

| | |
|---|---|
| *H04N 9/80* | (2006.01) |
| *H04N 5/932* | (2006.01) |
| *H04N 5/93* | (2006.01) |
| *G06F 3/01* | (2006.01) |
| *H04N 9/82* | (2006.01) |
| *H04N 5/765* | (2006.01) |
| *H04N 21/41* | (2011.01) |
| *H04N 21/422* | (2011.01) |

(Continued)

(52) U.S. Cl.
CPC ............... *G06F 3/016* (2013.01); *H04N 5/765* (2013.01); *H04N 9/8205* (2013.01); *H04N 21/4131* (2013.01); *H04N 21/4223* (2013.01); *H04N 21/42202* (2013.01); *H04N 21/435* (2013.01); *H04N 21/4325* (2013.01); *H04N 21/4334* (2013.01); *G06F 3/0346* (2013.01); *G11B 27/10* (2013.01)

(58) Field of Classification Search
None
See application file for complete search history.

(56) References Cited

U.S. PATENT DOCUMENTS

| 7,623,114 B2 | 11/2009 | Rank |
|---|---|---|
| 7,979,146 B2 | 7/2011 | Ullrich et al. |

(Continued)

FOREIGN PATENT DOCUMENTS

WO    WO 2011/011737    1/2011

OTHER PUBLICATIONS

Bannach, D., et al., "Automatic Event-Based Synchronization of Multimodal Data Streams from Wearable and Ambient Sensors," EuroSSC 2009, LNCS 5741, 2009, pp. 135-148.

(Continued)

*Primary Examiner* — Heather Jones
(74) *Attorney, Agent, or Firm* — Miles & Stockbridge P.C.

(57) ABSTRACT

A system includes a video recorder configured to record video data, a sensor configured to sense movement of an object and output sensor data representative of the movement of the object, a transformer configured to transform the sensor data into a haptic output signal, a haptic output device configured to generate a haptic effect to a user based on the haptic output signal, a display configured to display a video, and a processor configured to synchronize the video data and the haptic output signal, and output the video data to the display and the haptic output signal to the haptic output device so that the haptic effect is synchronized with the video displayed on the display.

20 Claims, 5 Drawing Sheets

(51) Int. Cl.
*H04N 21/4223* (2011.01)
*H04N 21/432* (2011.01)
*H04N 21/433* (2011.01)
*H04N 21/435* (2011.01)
G06F 3/0346 (2013.01)
G11B 27/10 (2006.01)

(56) References Cited

U.S. PATENT DOCUMENTS

| | | |
|---|---|---|
| 8,000,825 B2 | 8/2011 | Ullrich et al. |
| 8,378,964 B2 | 2/2013 | Ullrich et al. |
| 2005/0062841 A1* | 3/2005 | Rivera-Cintron .......... 348/14.02 |
| 2007/0236449 A1 | 10/2007 | Lacroix et al. |
| 2008/0223627 A1 | 9/2008 | Lacroix et al. |
| 2009/0096632 A1 | 4/2009 | Ullrich et al. |
| 2009/0128306 A1 | 5/2009 | Luden et al. |
| 2011/0202155 A1 | 8/2011 | Ullrich et al. |
| 2011/0215913 A1 | 9/2011 | Ullrich et al. |
| 2012/0206246 A1 | 8/2012 | Cruz-Hernandez et al. |
| 2012/0206247 A1 | 8/2012 | Bhatia et al. |
| 2014/0093221 A1* | 4/2014 | Wikander .................... 386/248 |

OTHER PUBLICATIONS

Extended Search Report, including the Search Opinion, issued for European Patent Application No. 14152551.9, dated May 30, 2014.

N. Landin et al., "Dimensional Reduction of High-Frequency Accelerations for Haptic Rendering," EuroHaptics 2010, Part II, LNCS 6192, pp. 79-86, 2010.

Danieau, et al., "A Framework for Enhancing Video Viewing Experience with Haptic Effects of Motion," IEEE Haptics Symposium, Vancouver, BC, Canada, Mar. 4-7, 2012, pp. 541-546.

* cited by examiner

HAPTIC SENSATION RECORDING AND PLAYBACK

CROSS-REFERENCE TO RELATED APPLICATIONS

This application claims the benefit of U.S. Provisional Patent Application Ser. No. 61/756,418, filed Jan. 24, 2013, the entire content of which is incorporated herein by reference.

FIELD

The present invention is related to systems and methods for providing haptic sensation recording and playback.

BACKGROUND

Electronic devices allow users to record videos that may capture both the visual and audio aspects of an event. Electronic devices may also be programmed to provide haptic sensations while the user is watching a video played on the electronic device. The haptic sensations are preprogrammed so that when the video is played, the user may experience haptic effects in conjunction with the video to provide a more immersive experience for the user. Existing devices only allow the haptic effects to be determined after the video has been recorded. Currently, creating haptic effects and sensations is a labor-intensive process that is not done in real time.

SUMMARY

It is desirable to be able to record a video of an event while at the same time record real-time aspects of the event so that the real-time aspects of the event may be played back with the video as haptic sensations to provide an even more realistic and immersive experience for the user watching the video and feeling haptic sensation playback. Recording real-time data from an object in a scene, and reproducing its experience haptically, is a more intuitive way of "capturing" an experience, when compared to offline artistic editing with programming tools and writing synchronization code to attempt to synchronize the haptic effects with the video. It is desirable to simplify the creation of such content.

According to an aspect of the present invention, there is provided a system that includes a video recorder configured to record video data, a sensor configured to sense movement of an object and output sensor data representative of the movement of the object, a transformer configured to transform the sensor data into a haptic output signal, a haptic output device configured to generate a haptic effect to a user based on the haptic output signal, a display configured to display a video, and a processor configured to synchronize the video data and the haptic output signal, and output the video data to the display and the haptic output signal to the haptic output device so that the haptic effect is synchronized with the video displayed on the display.

In an embodiment, the system also includes an audio recorder configured to record audio data, and a speaker configured to project sound. The processor may be further configured to receive the audio data, synchronize the audio data with the video data and the haptic output signal, and output the audio data to the speaker so that the sound is synchronized with the video displayed on the display and the haptic effect generated by the haptic output device.

In an embodiment, the video recorder, the audio recorder, and the sensor are part of the same electronic device. In an embodiment, the haptic output device, the display, and the speaker are part of the same electronic device. In an embodiment, the video recorder, audio recorder, the sensor, the haptic output device, the display, the speaker, and the processor are part of the same electronic device. In an embodiment, the haptic output device and the display are part of the same electronic device.

In an embodiment, the processor comprises the transformer, and further comprises a decoder configured to synchronize the video data and the haptic output signal.

In an embodiment, the sensor is selected from the group consisting of: an accelerometer, a gyroscope, and a contact pressure sensor.

In an embodiment, the system includes a plurality of sensors, and the plurality of sensors are selected from the group consisting of: an accelerometer, a gyroscope, and a contact pressure sensor.

According to an aspect of the invention, there is provided a system that includes a display configured to display a video, a video recorder configured to record video data, a sensor configured to sense movement of an object and output sensor data representative of the movement of the object, a transformer configured to transform the sensor data into a haptic output signal, and an electronic handheld device. The electronic handheld device includes a haptic output device configured to generate a haptic effect to a user of the handheld device based on the haptic output signal, and a processor configured to synchronize the video data and the haptic output signal, and output the video data to the display and the haptic output signal to the haptic output device so that the haptic effect is synchronized with the video displayed on the display.

According to an aspect of the present invention, there is provided a method that includes recording a video with a video recorder, sensing movement of an object being recorded in the video with a sensor, transforming the sensed movement into a haptic output signal, and synchronizing the video and the haptic output signal.

In an embodiment, the method includes generating at least one haptic effect based on the haptic output signal, and displaying the video on a display in synchronization with the haptic effect.

In an embodiment, the method includes recording audio with an audio recorder and synchronizing the audio with the video and the haptic output signal.

In an embodiment, the method includes generating a haptic effect based on the haptic output signal, displaying the video on a display, and projecting the audio with a speaker so that the haptic effect is synchronized with the video displayed on the display and the audio projected by the speaker.

BRIEF DESCRIPTION OF THE DRAWINGS

The components of the following Figures are illustrated to emphasize the general principles of the present disclosure and are not necessarily drawn to scale. Reference characters designating corresponding components are repeated as necessary throughout the Figures for the sake of consistency and clarity.

DETAILED DESCRIPTION

Figure 1:
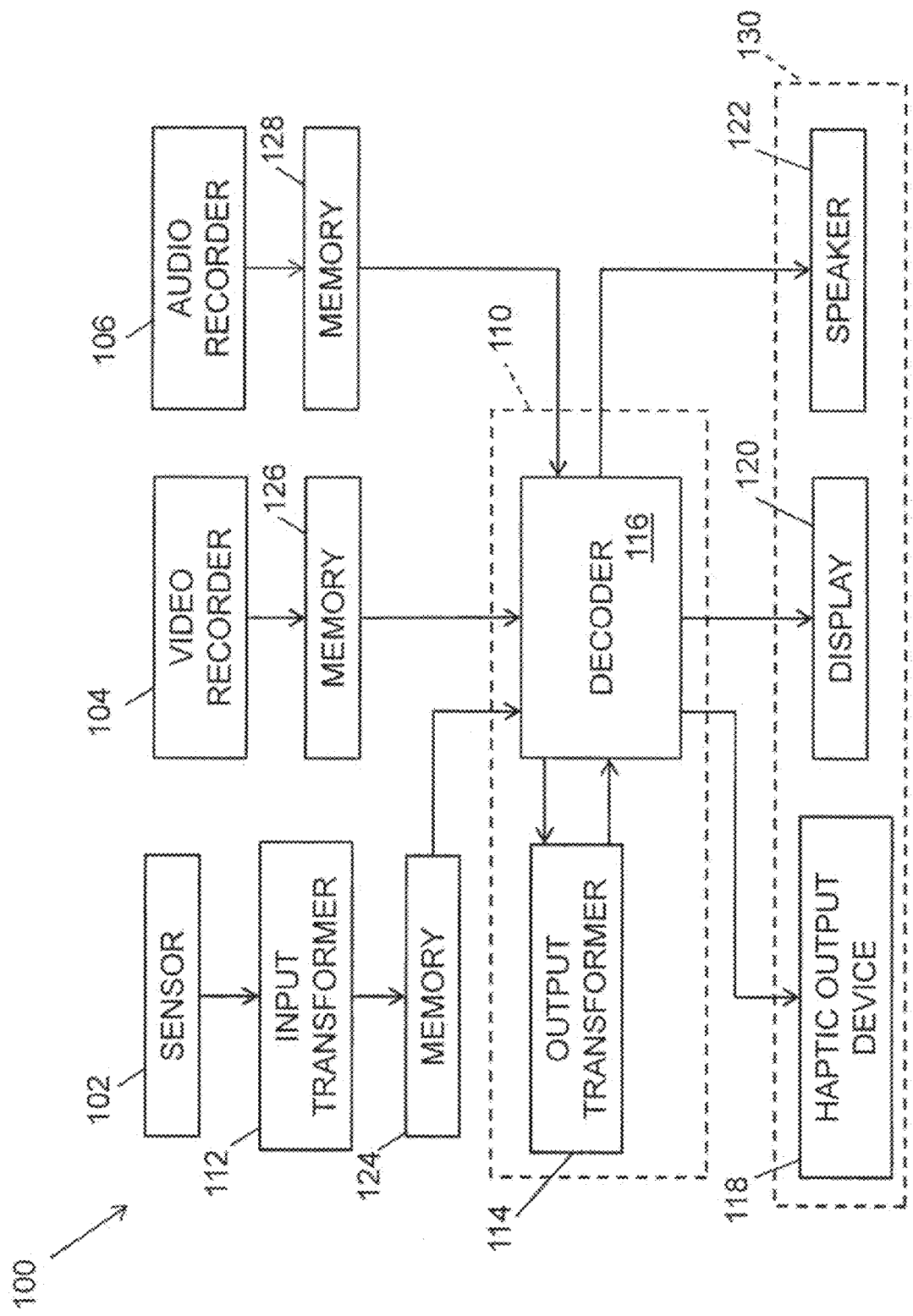
FIG. 1 illustrates an embodiment of a system for recording and providing a haptic effect.

FIG. 1 illustrates a system 100 in accordance with an embodiment of the invention. As illustrated, the system 100 includes one or more sensors 102, which are configured to sense movement of an object and convert the sensed movement into sensor data, a video recorder 104 configured to capture and record images, and an audio recorder 106 configured to capture and record sound. In an embodiment, the sensor(s) 102, the video recorder 104, and the audio recorder 106 may be part of the same electronic device. In an embodiment, the video recorder 104 and the audio recorder 106 may be part of the same electronic device, and the sensor(s) 102 may be separate from the electronic device that includes the video recorder 104 and the audio recorder 106. In an embodiment, the sensor(s) 102, the video recorder 104, and the audio recorder 106 may be separate, stand-alone devices or part of separate, stand-alone devices.

A processor 110 is configured to process signals and data output by the sensor(s) 102, the video recorder 104, and the audio recorder 106, as discussed in further detail below. The system 100 also includes an input transformer 112, an output transformer 114, which may be part of the processor 110, and a decoder 116, which may also be part of the processor 110. Aspects of the input transformer 112, the output transformer 114, and the decoder 116 are discussed in further detail below.

As illustrated in FIG. 1, the system 100 also includes a haptic output device 118 configured to output haptic effects to a user of the system, a display 120 configured to display images, such as the images captured by the video recorder 104, and a speaker 122 configured to output sound, which may be the sound captured by the audio recorder 106. The haptic output device 118, the display 120, and the speaker 122 may be part of an electronic playback device 130, as discussed in further detail below. In an embodiment, the haptic output device 118, the display 120, and the speaker 122 may be separate devices that are configured to communicate with each other through a wireless connection, for example. In an embodiment, the haptic output device 118 may be part of a wearable device, the display 120 may be part of a television, and the speaker 122 may be a wireless speaker that is separate from the display 120.

The haptic output device 118 may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys, a macro-composite fiber, actuator, an electro-static actuator, an electro-tactile actuator, and/or another type of actuator that provides a physical feedback such as a haptic (e.g., vibrotactile) feedback. The haptic output device 118 may include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on.

Electronic memory 124 may be used to store data sensed by the sensor(s) 102, electronic memory 126 may be used to store data that is recorded by the video recorder 104, and electronic memory 128 may be used to store data that is recorded by the audio recorder 106. The memory 124, 126, 128 may include one or more internally fixed storage units, removable storage units, and/or remotely accessible storage units. The various storage units may include any combination of volatile memory and non-volatile memory. The storage units may be configured to store any combination of information, data, instructions, software code, etc. In embodiments in which the sensor(s) 102, the video recorder 104, and the audio recorder 106 are part of the same electronic device, the memory 124, 126, 128 may be co-located. In embodiments in which the video recorder 104 and the audio recorder 106 are part of the same electronic device, the memory 126, 128 may be co-located.

In an embodiment, a user may record video and/or audio of a scene or event using the video recorder 104 and/or the audio recorder 106. In an embodiment, the video recorder 104 and the audio recorder 106 may be part of the same recording device, such as a video camcorder, a smart phone, etc. The video and audio that is recorded may be stored in the electronic memory 126, as discussed above. In an embodiment, the sensor(s) 102 may be placed on an object of interest, such as an object being recorded in the video.

As discussed above, the data generated by the sensor(s) 102 may be stored in the electronic memory 124. In addition, the data generated by the sensor(s) 102 may be transformed by the input transformer 112 prior to being stored in the electronic memory 124, as illustrated in FIG. 1. The transformation of the sensor data is considered to be an optional step and whether the transformation is needed may depend on the nature of the sensors being used. Details of an embodiment of the sensor 102 are discussed in further detail below.

The decoder 116, which may be part of a media player configured to playback the video, i.e. media file, is configured to read the data generated by the sensor(s) 102 from the electronic memory 124, and associate the data temporally with the audio data and video data that were recorded and stored in the electronic memory 126. During media playback, the decoder 116 may pass the sensor data through an output transformer 114 configured to transform the sensor data into a haptic output signal or haptic sensory commands, which include but are not limited to, vibration, surface friction modulation, skin pinch, skin squeeze, etc. The decoder 116 may be configured to synchronize the haptic output signal that was transformed from the sensor data with the video data and the audio data so that the haptic effect is synchronized with the video and audio during playback. In an embodiment, the synchronization may be completed by ensuring that time is the same in the video data, the audio data, and the haptic effect during playback.

The processor 110 may be a general-purpose or specific-purpose processor or microcontroller for managing or controlling the operations and functions of the system 100. For example, the processor 110 may be specifically designed as an application-specific integrated circuit ("ASIC") to control output signals to the haptic output device 118 to provide haptic effects. The processor 110 may be configured to decide, based on predefined factors, what haptic effects are to be generated, the order in which the haptic effects are generated, and the magnitude, frequency, duration, and/or other parameters of the haptic effects. The processor 110 may also be configured to provide streaming commands that may be used to drive the haptic output device 118 for providing a particular haptic effect. In some embodiments, the processor 110 may actually include a plurality of processors, each configured to perform certain functions within the system 100.

The processor 110 may also include memory that includes one or more storage devices that may include haptic effect profiles, instructions for how the haptic output device 118 is to be driven, and/or other information for generating haptic effects. In an embodiment in which the entire system 100 illustrated in FIG. 1 is part of a single electronic device, the memory 124, 126 may be part of the processor 110.

The haptic output signal may then be transmitted from the processor 110, e.g., from the decoder 116 of the processor 110, to the haptic output device 118 so that the person(s) experiencing the media through the electronic playback device 130 that includes the haptic output device 118 may more fully experience the event being played back. The electronic playback device 130 may be any device, such as an electronic handheld device, such as a mobile phone, gaming device, personal digital assistant ("PDA"), portable e-mail device, portable Internet access device, calculator, tablet, etc. The electronic playback device 130 may include, but is not limited to, a handheld device with the display 120, which may be a high definition display, that displays the media, a handheld object that is capable of producing haptic sensations or effects, or an object attached to the user's body, leaning up to the user's body, or otherwise able to transmit tactile sensations and haptic effects to the user.

In an embodiment, the processor 110 and the haptic output device 118 may be part of an electronic handheld device, which may be a phone or a tablet, and the electronic handheld device is configured to output the video data to a separate display 120, which may be a television.

In an embodiment, the system 100 may include a mobile phone having a gyroscope, a compass, and three-axis accelerometer sensors for the sensors 102, as well as a built-in camera for the video recorder 104. In this instance, all of the components illustrated in FIG. 1, including the data recording sensors 102, video recorder 104, audio recorder 106, processor 110 including the decoder 116 and output transformer 114, haptic output device 118, display 120, speaker 122, input transformer 112, and electronic memory 124, 126, may be self-contained, and the entire system 100 may be affixed to the person or a piece of equipment performing the activity of interest.

In an embodiment, a first-person perspective video camera may be mounted to a helmet or piece of equipment performing the activity of interest, and the video camera may incorporate a number of data sensors 102, such as accelerometers, a global positioning system ("GPS"), and gyroscopes, the input transformer 112, if needed, the electronic memory 124, the video recorder 104, the audio recorder 106, and the electronic memory 126. The remaining parts of the system 100, such as the processor 110 including the decoder 116 and output transformer 114, the haptic output device 118, the display 120, and the speaker 122, may be located in a separate playback device, such as the electronic playback device 130, as discussed above.

In an embodiment, the sensor(s) 102, which may include one or more data sensors, such as accelerometers, GPS, etc., may be affixed either to the person or to equipment performing the activity of interest. The sensor(s) 102 may be contained in a sensor box, or some other container that is configured to protect the sensor(s) 102. The sensor box may have data recording means, such as the input transformer 112 and the electronic memory 124, built-in, or may rely on a data connection to secondary device (such as a mobile device) to record the data during the activity.

In an embodiment, the sensor(s) 102 may be installed on a person who is the subject of the video, and the video recorder 104, and optionally the audio recorder 106, may be operated by another person. For example, the person who is the subject of the video may be a snowboarder and at least one sensor 102 may be attached to the snowboarder's boot and/or on other pieces of clothing or equipment, such as the snowboarder's snowboard. The sensor(s) 102 may include accelerometers configured to provide the g-force accelerations experienced by the snowboard, gyroscope sensors configured to provide the orientation of the snowboard, and contact pressure sensors configured to provide the load applied to the snowboard by the snowboarder's boots. In an embodiment, the audio recorder 106 may be attached to an article of clothing or equipment, such as a helmet of the snowboarder so that the sound of the snowboard passing over the snow may be captured.

In an embodiment, a recording session may be initiated in which the stream of acceleration data, gyroscope data, and contact pressure data is recorded alongside the video and audio data. The video recorder 104 and/or audio recorder 106 may be mounted to the snowboarder's helmet. In an embodiment, the video recorder 104 and/or audio recorder 106 may be an array of video cameras mounted at various locations in a snow park's half pipe, where the snowboarding activity is to be performed. In an embodiment, the video recorder 104 may be an array of video cameras located at various locations in a snow park's half pipe and the audio recorder 106 may be mounted to an article of clothing or equipment of the snowboarder, as described above. Other combinations of the locations of the sensor(s) 102, video recorder 104, and the audio recorder 106 may be used and may depend on the activity being recorded so that an optimum haptic/audio/visual experience may be realized by the user of the electronic playback device 130 during playback. The synchronization of all of these data streams may be managed by recording software, which may reside in the processor 110 of the system 100 illustrated in FIG. 1.

In an embodiment, flexible container formats, such as MPEG-4, that allow for the storage of data other than video and audio in a single file container, may be used. In such an embodiment, a particular set of encoders may be needed to place the sensor data into the MPEG-4 file during recording. In an embodiment, special software may be written to store the non-audio and video (A/V) sensor data in a separate file, but with special markers in the sensor data to allow for proper synchronization at playback time. In this embodiment, very little input transformation may need to be applied, beyond shaping the sensor data to conform to the limitations of the designed recording format. The exact format may be determined by the implementer. Once the snowboarder has completed his or her activity, the recording may be stopped. The MPEG-4 file may be closed, and all of the sensor data may reside in the MPEG-4 file.

In an embodiment, the playback device may be the electronic playback device 130 of FIG. 1, and may be in the form of a mobile phone or tablet having the display 120, the speaker 122, and a vibration device as the haptic output device 118 to provide the haptic effect. In an embodiment, the playback device may be a gaming console connected to a television having the display 120 and the speaker 122, and also connected to a gaming peripheral, such as a gamepad, that includes the haptic output device 118 to provide the haptic effect.

Either at a later time, or concurrently with the activity being performed, one or more viewers may be interested in experiencing the activity. To playback the activity, the viewer may launch the appropriate playback software on their playback device with the objective of experiencing the performer's activity. In an embodiment, the playback software may include a player software application that incorporates the sensor decoding scheme performed by the decoder 116, as well as output transform software that may be run by the output transformer 114, in order to transform the sensor data into a haptic output signal suitable for the haptic output device 118 in the playback device. In an embodiment, a player software application may incorporate the sensor decoding scheme. The player software may rely on the output transform software being resident or otherwise pre-installed on the playback device, and such output transform software may transform the sensor data into the haptic output signal suitable for the haptic output device 118 in the playback device. In other words, the output transformer 114 and/or decoder 116 may be located on the playback device.

In an embodiment, a player software application may rely on the playback device's operating system software to perform the media playback, which incorporates the sensor decoding scheme. The operating system software may rely on the output transform software being resident or otherwise pre-installed on the playback device, such output transform software transforming the sensor data into a haptic output signal suitable for the haptic output device 118 in the playback device. The viewer may then experience haptic sensations associated with the viewing of the performance, such haptic sensations being produced by the output transform software.

In an embodiment, the output transform software may include some of the sensor data, while other sensor data is ignored. For example, the gyroscope data may be included, while the contact pressure sensor data may be ignored. The magnitudes of the acceleration data may be computed by computing the vector magnitude of X-Y-Z acceleration components. This acceleration magnitude signal may then be band-pass filtered such that only acceleration magnitude signals in the 20-200 Hz range are output, with other frequency content filtered out. The filtered acceleration signal may then be put through a soft-knee compression algorithm to gently clip the output magnitudes between +6 and −6 gees, then all negative signals may be zeroed/ignored, and the resultant compressed, single-sided output signal may be used to control a magnitude of vibration provided by the haptic output device between 0-100% vibration. In this way, the viewer may feel a representation of the acceleration variants felt by the performer's snowboard.

In an embodiment, the acceleration data, gyroscope data, and contact pressure sensor data may be combined into a haptic output signal in the following way. Whenever the contact pressure is low, the snowboarder may be assumed to be jumping and therefore all haptic output is zeroed out. When the contact pressure is significant, the contact pressure may be multiplied by the acceleration magnitude. This output may then be multiplied by the change in orientation signal (the first time derivative of the orientation heading, derived from the gyroscope signal) to obtain an "activity intensity" signal. This signal may then be filtered and compressed in such a way so as to obtain a reasonable representation of the range of sensations experienced by the performer during the snowboarding activity, and the signal may be applied to the playback device's haptic output device 118.

In an embodiment, whenever the contact pressure is low, the snowboarder may be assumed to be jumping and therefore all haptic output is zeroed out. When the contact pressure is significant, the acceleration magnitude may be band pass filtered in the 100-200 Hz range, for example, and its output range may be highly compressed using a hard-knee compressor. This signal may be applied to the playback device's haptic output device 118.

The viewer holding or otherwise in contact with the haptic output device 118 may then feel the sensations produced by the output transformer 114 and output by the haptic output device 118.

Example

Figure 2:
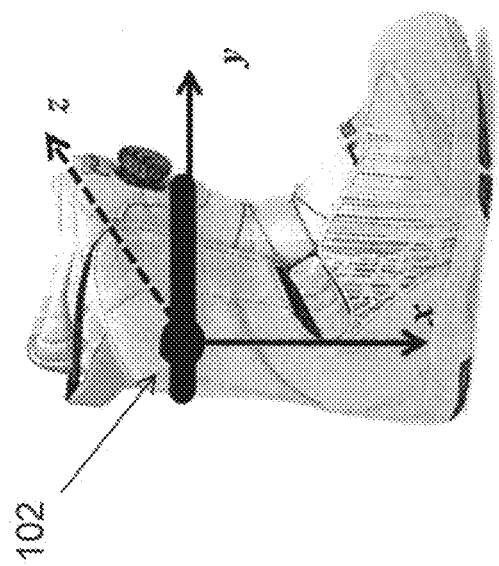
FIG. 2 illustrates an embodiment of a wearable sensor that may be used as part of the system of FIG. 1.

Adequate haptic effects/sensations were generated using video and sensors recordings that were acquired at the same time. A three-axis accelerometer was used for the sensor 102 and was fixed to a first snowboarder's boot using a strap-on, as illustrated in FIG. 2. The three-axis accelerometer was oriented so that the X axis was generally aligned from up to down, the Y axis was generally aligned from back to front, and the Z axis was generally aligned from right to left, with respect to the orientation of the snowboarder's boot, as illustrated in FIG. 2. A video camcorder was used for the video recorder 104 and the audio recorder 106 and was operated by a second snowboarder, who was following the first snowboarder in order to generate the video and audio data as the first snowboarder generated the sensor data.

Figure 3:
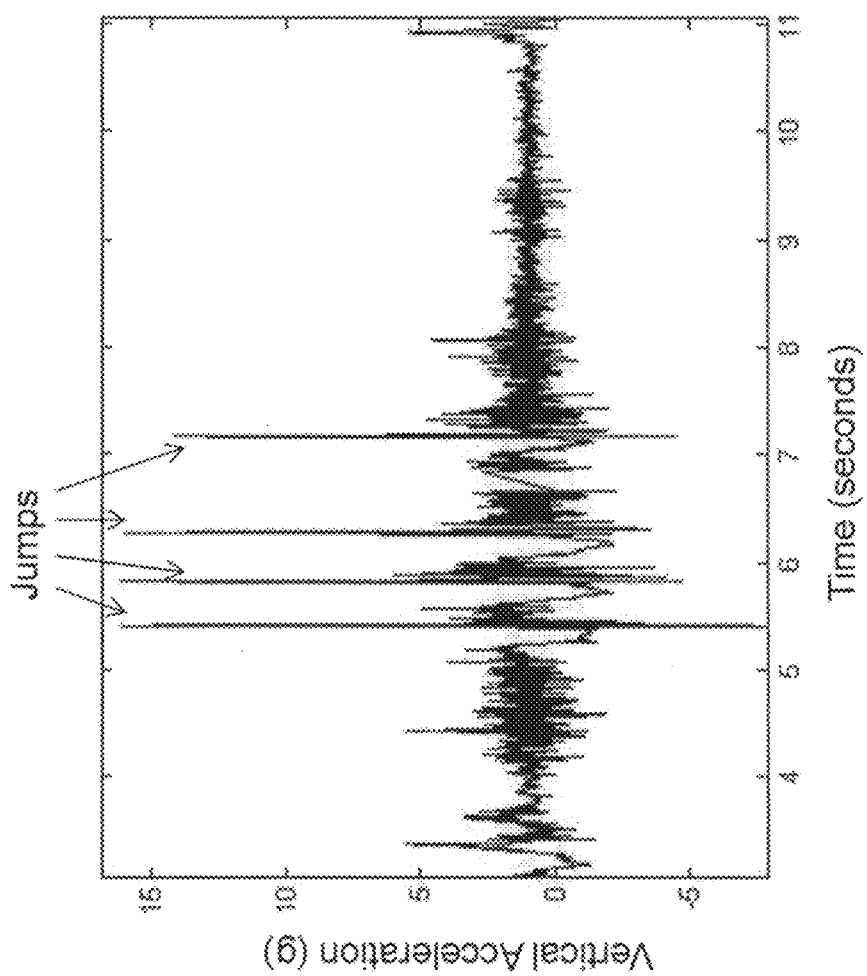
FIG. 3 illustrates a signal representative of vertical acceleration as a function of time that may be measured by the sensor of FIG. 2.

After all of the data was recorded, the registered data from the sensor 102 (accelerometer) was synchronized with the video images and audio data recorded by the video recorder 104 and the audio recorder 106. The first snowboarder was asked to accomplish four jumps before starting his descent. The timing of the four jumps was detected by analyzing the video feed from the video recorder 104 image by image. In addition, the timing of the jumps were detected by analyzing the vertical acceleration signal $A_x$ from the sensor 102, as the jumps translated into four consecutive peaks, as illustrated in FIG. 3. Because the accelerometer readings were time-stamped, the accelerations could be extracted and synchronized with the entire video.

After synchronizing the data, specific events called "bumps" that were related to the moment of landing after a jump in the air or while hopping on any object (e.g. rails) were automatically detected. These bumps may be characterized by creating a sudden peak in the acceleration signal related to the direction of the landing. In snowboarding, a landing may be vertical or 'inclined', so the magnitude of the vector $A_x+A_y$ for each acceleration sample was calculated. Whenever the magnitude value was above a certain threshold, the sample was considered to represent a bump. For each bump detected, a bump effect was introduced in the haptic track as a haptic effect at the moment of its occurrence. The effect strength was relative to the bump magnitude.

Figure 4:
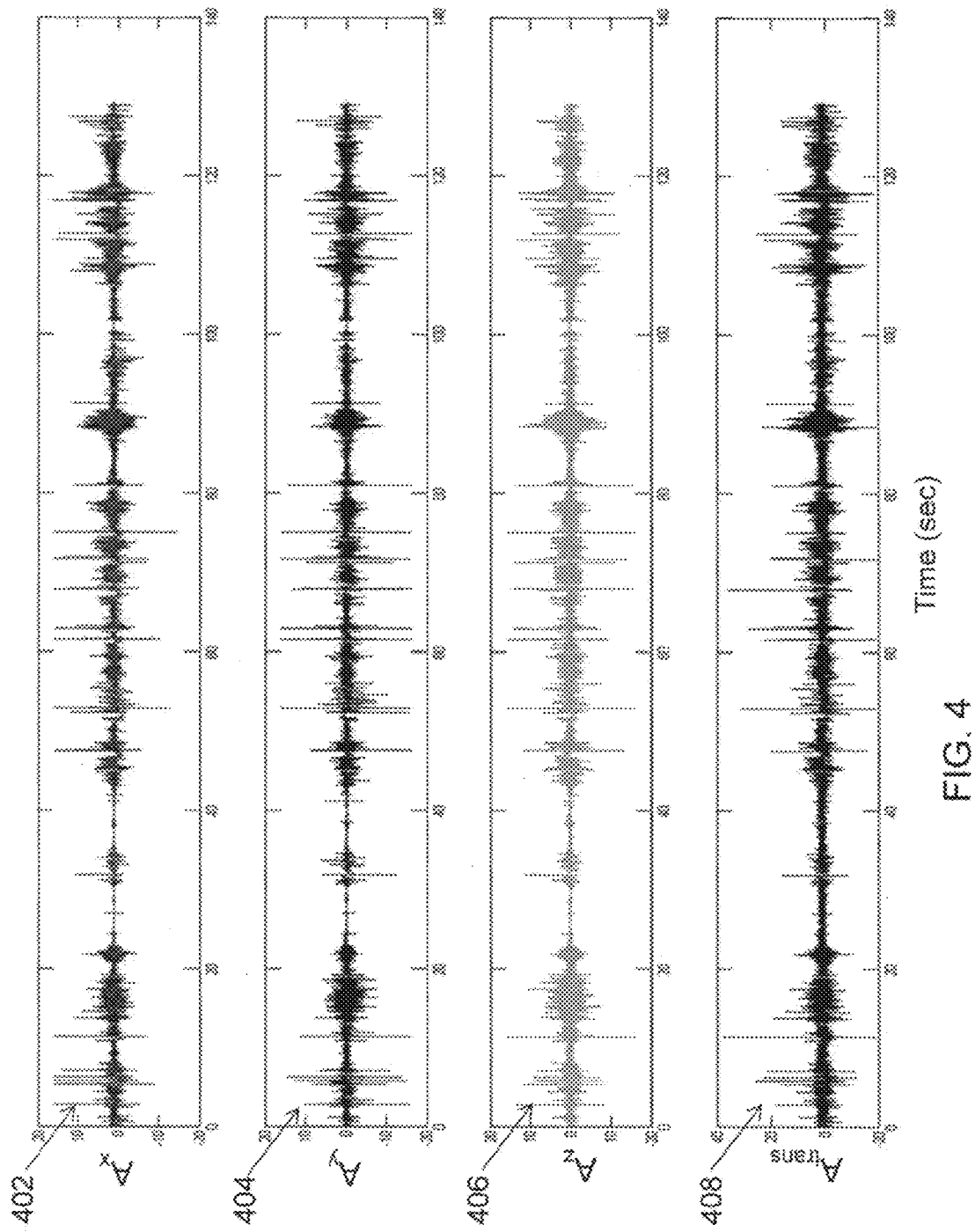
FIG. 4 illustrates signals representative of acceleration as a function of time that may be measured by the sensor of FIG. 2.

The texture of the surface on which the snowboarder was sliding was captured and represented in the haptic track using the following approach. Each of the three acceleration signals $A_x$, $A_y$, and $A_z$, represented by 402, 404, 406 in FIG. 4, respectively, was translated from the time-domain into the frequency domain using a Fast Fourier transform ("FFT"). The three frequency domain signals were then added as vectors to form a single signal $A_{transf}$. This latter signal was finally translated back to the time domain into the $A_{trans}$ signal, as represented by 408 in FIG. 4. This technique of transforming three signals into one signal is known in the art, and therefore specific details of the transformation are not provided herein.

The single $A_{trans}$ signal 408 was then up-sampled from its original sampling rate (i.e. 400 Hz) to 8000 Hz by linear interpolation. In this interpolated signal, all of the values corresponding to bumps were fixed to 0. The resulting signal was then multiplied by sine waves with random frequencies between 120 Hz and 270 Hz, and then normalized and copied directly in the haptic track that would thus contain the texture and bump effects. The haptic track could then be played back in the playback device by the haptic output device 118. In an embodiment, when the acceleration signal is under sampled (e.g., at a sampling rate <100 Hz), the up-sampling of the transformed signal to 8000 Hz may be done by adding a white Bayesian noise between the captured data samples instead of interpolation.

In an embodiment, the "swings" of the snowboarder, i.e. left to right direction changes or "s-curves", may be detected and a relevant haptic effect may be created and added to the texture and bumps. In an embodiment, accelerations of the snowboard itself and not the snowboarder may be used. In an embodiment, the acceleration signals may be shifted in the frequency domain by 150 Hz before being added into the $A_{transf}$ signal.

Figure 5:
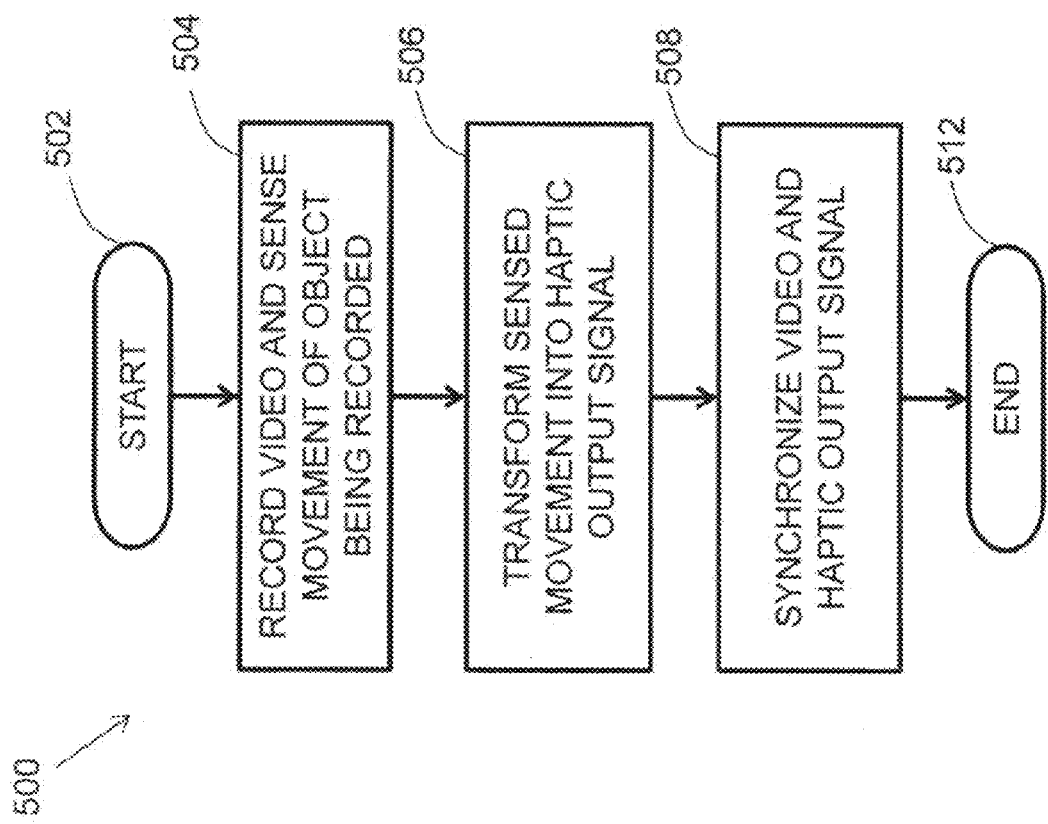
FIG. 5 is a flow diagram of a method according to an embodiment of the invention.

FIG. 5 illustrates a method 500 in accordance with embodiments of the invention described herein. The method 500 starts at 502. At 504, video is recorded with a video recorder, such as the video recorder 104 described above, and movement of an object being recorded by the video recorder is sensed with a sensor, such as the sensor 102 described above. At 506, the movement sensed by the sensor is transformed into a haptic output signal, and at 508, the video and the haptic output signal are synchronized. The method may end at 512. In an embodiment, the method may further include generating a haptic effect based on the haptic output signal with, for example, the haptic output device 118 described above, and displaying the video on a display, such as the display 120 described above, so that the haptic effect is synchronized with the video displayed on the display during playback on a playback device, such as the electronic playback device 130 described above. In an embodiment, audio may also be recorded, synchronized, and projected during playback on the playback device.

Embodiments of the invention described herein allow content creators to record media, such as video and/or audio, and other data, potentially transform it, and transmit haptic sensations associated with the media as experienced and recorded by the content creator. Recording and transforming real-world sensor data to produce haptic output is a more cost-efficient way to generate haptic content (when compared to hand-authored synthesis of haptic signals), and may produce contextually-appropriate "realistic" sensations, with the proper output transform.

The embodiments described herein represent a number of possible implementations and examples and are not intended to necessarily limit the present disclosure to any specific embodiments. For example, in the above-described embodiments, the common capability is one of collecting and recording sensor data beyond the typical video and audio feed. Various modifications can be made to these embodiments as would be understood by one of ordinary skill in the art. Any such modifications are intended to be included within the spirit and scope of the present disclosure and protected by the following claims.

What is claimed is:

1. A system comprising:
a video recorder configured to record video data;
a sensor configured to sense movement of an object and output sensor data representative of the movement of the object;
a transformer configured to transform the sensor data into a haptic output signal;
a haptic output device configured to generate a haptic effect to a user based on the haptic output signal;
a display configured to display a video; and
a processor configured to synchronize the video data and the haptic output signal, and output the video data to the display and the haptic output signal to the haptic output device so that the haptic effect is synchronized with the video displayed on the display,
wherein the sensor data comprises X-Y-Z acceleration components, wherein the transformer is configured to generate an acceleration magnitude signal based on the X-Y-Z acceleration components and filter the acceleration magnitude signal to filter out frequency content outside of a predetermined range, and wherein the haptic output signal is based on the filtered acceleration magnitude signal.

2. The system according to claim 1, further comprising an audio recorder configured to record audio data, and a speaker configured to project sound, wherein the processor is further configured to receive the audio data, synchronize the audio data with the video data and the haptic output signal, and output the audio data to the speaker so that the sound is synchronized with the video displayed on the display and the haptic effect generated by the haptic output device.

3. The system according to claim 2, wherein the video recorder, the audio recorder, and the sensor are part of the same electronic device.

4. The system according to claim 2, wherein the haptic output device, the display, and the speaker are part of the same electronic device.

5. The system according to claim 2, wherein the video recorder, audio recorder, the sensor, the haptic output device, the display, the speaker, and the processor are part of the same electronic device.

6. The system according to claim 1, wherein the haptic output device and the display are part of the same electronic device.

7. The system according to claim 1, wherein the processor comprises the transformer, and further comprises a decoder configured to synchronize the video data and the haptic output signal.

8. The system according to claim 1, wherein the sensor is selected from the group consisting of: an accelerometer, a gyroscope, and a contact pressure sensor.

9. The system according to claim 1, wherein the system comprises a plurality of sensors, and wherein the plurality of sensors are selected from the group consisting of: an accelerometer, a gyroscope, and a contact pressure sensor.

10. A system comprising:
a display configured to display a video;
a video recorder configured to record video data;
a sensor configured to sense movement of an object and output sensor data representative of the movement of the object;
a transformer configured to transform the sensor data into a haptic output signal; and
an electronic handheld device comprising
a haptic output device configured to generate a haptic effect to a user of the handheld device based on the haptic output signal; and
a processor configured to synchronize the video data and the haptic output signal, and output the video data to the display and the haptic output signal to the haptic output device so that the haptic effect is synchronized with the video displayed on the display,
wherein the sensor data comprises X-Y-Z acceleration components, wherein the transformer is configured to generate an acceleration magnitude signal based on the X-Y-Z acceleration components and filter the acceleration magnitude signal to filter out frequency content outside of a predetermined range, and wherein the haptic output signal is based on the filtered acceleration magnitude signal.

11. The system according to claim 10, further comprising an audio recorder configured to record audio data, and a speaker configured to project sound, wherein the processor is further configured to receive the audio data, synchronize the audio data with the video data and the haptic output signal, and output the audio data to the speaker so that the sound is synchronized with the video displayed on the display and the haptic effect generated by the haptic output device.

12. A method comprising:
recording a video with a video recorder;
sensing movement of an object being recorded in the video with a sensor;
transforming the sensed movement into a haptic output signal; and
synchronizing the video and the haptic output signal,
wherein the sensing movement of the object being recorded in the video with the sensor comprises sensing X-Y-Z acceleration components, and
wherein the transforming the sensed movement into the haptic output signal comprises
generating an acceleration magnitude signal based on the X-Y-Z acceleration components; and
filtering the acceleration magnitude signal to filter out frequency content outside of a predetermined range, wherein the haptic output signal is based on the filtered acceleration magnitude signal.

13. The method according to claim 12, further comprising:
generating at least one haptic effect based on the haptic output signal; and
displaying the video on a display in synchronization with the haptic effect.

14. The method according to claim 12, further comprising recording audio with an audio recorder and synchronizing the audio with the video and the haptic output signal.

15. The method according to claim 14, further comprising generating a haptic effect based on the haptic output signal, displaying the video on a display, and projecting the audio with a speaker so that the haptic effect is synchronized with the video displayed on the display and the audio projected by the speaker.

16. The method according to claim 12, wherein the sensor is selected from the group consisting of: an accelerometer, a gyroscope, and a contact pressure sensor.

17. A system comprising:
a video recorder configured to record video data;
a sensor configured to sense movement of an object and output sensor data representative of the movement of the object;
a transformer configured to transform the sensor data into a haptic output signal;
a haptic output device configured to generate a haptic effect to a user based on the haptic output signal;
a display configured to display a video; and
a processor configured to synchronize the video data and the haptic output signal, and output the video data to the display and the haptic output signal to the haptic output device so that the haptic effect is synchronized with the video displayed on the display,
wherein the sensor data comprises X-Y-Z acceleration components, wherein the transformer is configured to translate the X-Y-Z acceleration components from a time-domain into a frequency domain, combine the X-Y-Z acceleration components in the frequency domain into a single acceleration signal, and translate the single acceleration signal from the frequency domain into the time-domain, and wherein the haptic output signal is based on the single acceleration signal in the time-domain.

18. The system according to claim 17, wherein the transformer is further configured to up-sample the single acceleration signal from an original sampling rate to a higher sampling rate, and multiply the up-sampled single acceleration signal by sine waves with random frequencies, and wherein the haptic output signal is based on the multiplied up-sampled single acceleration signal.

19. A method comprising:
recording a video with a video recorder;
sensing movement of an object being recorded in the video with a sensor;
transforming the sensed movement into a haptic output signal; and
synchronizing the video and the haptic output signal,
wherein the sensing movement of the object being recorded in the video with the sensor comprises sensing X-Y-Z acceleration components, and
wherein the transforming the sensed movement into the haptic output signal comprises:
translating the X-Y-Z acceleration components from a time-domain into a frequency domain;
combining the X-Y-Z acceleration components in the frequency domain into a single acceleration signal; and
translating the single acceleration signal from the frequency domain into the time-domain, wherein the haptic output signal is based on the single acceleration signal in the time-domain.

20. The method according to claim 19, wherein the transforming the sensed movement into the haptic output signal further comprises:
up-sampling the single acceleration signal from an original sampling rate to a higher sampling rate; and
multiplying the up-sampled single acceleration signal by sine waves with random frequencies, wherein the haptic output signal is based on the multiplied up-sampled single acceleration signal.

* * * * *